US010812975B1

United States Patent
Easwar Prasad et al.

(10) Patent No.: US 10,812,975 B1
(45) Date of Patent: Oct. 20, 2020

(54) METHODS AND SYSTEMS FOR BLOCKCHAIN SMART CONTRACT IN HOTSPOT 2.0 NETWORK FOR USER AUTHENTICATION WHILE ROAMING

(71) Applicant: HEWLETT PACKARD ENTERPRISE DEVELOPMENT LP, Houston, TX (US)

(72) Inventors: Ananth Narayanan Easwar Prasad, Bangalore (IN); Fazlur Rahman Sit Mohamed Ali, Bangalore (IN); Subbulakshmi Kallidaikurichi Viswesvaran, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/574,601

(22) Filed: Sep. 18, 2019

(51) Int. Cl.
*H04W 12/06* (2009.01)
*H04W 48/18* (2009.01)
(Continued)

(52) U.S. Cl.
CPC ........... *H04W 12/06* (2013.01); *H04W 48/18* (2013.01); *H04W 84/12* (2013.01); *H04W 88/08* (2013.01)

(58) Field of Classification Search
CPC ..... H04W 12/06; H04W 48/18; H04W 12/08; H04W 88/02; H04W 84/12; H04W 12/00;
(Continued)

(56) References Cited

U.S. PATENT DOCUMENTS 9,204,383 B2    12/2015   Canpolat et al.
1,029,912 A1    5/2019    Suthar et al.
(Continued)

FOREIGN PATENT DOCUMENTS

EP    3 579 494 A1 *   6/2018   ............... H04L 9/32

OTHER PUBLICATIONS

Arkenberg, C. et al., How Can Telecom, Media, and Entertainment Find the Value in Blockchain?, (Web Page), Aug. 17, 2018, 14 Pgs.
(Continued)

*Primary Examiner* — Meless N Zewdu
(74) *Attorney, Agent, or Firm* — Sheppard Mullin Richter & Hampton

(57) ABSTRACT

Methods and systems of user authentication for roaming access to a wireless communications network, using blockchain, is described. A wireless access point (WAP) can provide roaming connectivity to a Wi-Fi network for a mobile device, for example at a public hotspot. The disclosed WAP is blockchain-enabled, allowing connectivity to a blockchain network. Accordingly, when a WAP receives a connection request to the Wi-Fi network, the WAP can execute a smart contract in the blockchain to determine whether a user of the mobile device is authenticated for roaming access to the Wi-Fi network. In some cases, the smart contract verifies that service providers of the mobile device and the Wi-Fi network have a roaming agreement. Also, the smart contact can verify that the user is authenticated by the service provider of the mobile device. In some cases, the WAP device functions in accordance with a Hotspot 2.0 (HS2) networking standard.

13 Claims, 6 Drawing Sheets

(51) Int. Cl.
*H04W 84/12* (2009.01)
*H04W 88/08* (2009.01)

(58) Field of Classification Search
CPC . H04W 12/02; H04W 12/04; H04W 12/0602; H04W 12/0605; H04W 88/00; H04W 8/02; H04W 8/06; H04W 36/0072; H04W 36/0077; H04W 48/20; H04W 48/00; H04W 92/10; H04W 84/042; H04W 48/08; H04W 88/08; H04L 63/08; H04L 63/10; H04L 63/102; H04L 9/0637; G06Q 20/40; G06Q 20/325; G06F 9/4451; G06F 21/30; G06F 21/31; H04M 15/8038
See application file for complete search history.

(56) References Cited

U.S. PATENT DOCUMENTS

| | | | | |
|---|---|---|---|---|
| 2018/0037401 | A1* | 2/2018 | Wang et al. | H04W 12/08 |
| 2018/0096752 | A1* | 4/2018 | Ovalle | H04B 7/04 |
| 2018/0295528 | A1* | 10/2018 | Anantha et al. | H04W 24/02 |
| 2019/0158469 | A1 | 5/2019 | Gonzalez | |
| 2019/0223089 | A1* | 7/2019 | Salgueiro et al. | H04W 48/14 |
| 2019/0379664 | A1* | 12/2019 | Suthar et al. | H04L 63/0892 |
| 2019/0380031 | A1* | 12/2019 | Suthar et al. | H04W 12/06 |
| 2020/0057860 | A1* | 2/2020 | Patil et al. | G06F 21/6209 |

OTHER PUBLICATIONS

Bubley, D., Blockchain & Distributed Ledgers, (Research Paper), Disruptive Analysis, Blockchain & Telecoms, Aug. 2017, 12 Pgs., Distruptive Analysis Ltd.

Keil, J., Blockchain Use Cases in the Telecom Industry, (Web Page), Mar. 28, 2019, 6 Pgs.

Ling, X. et al., Blockchain Radio Access Network (B-Ran): Towards Decentralized Secure Radio Access Paradigm, (Research Paper), IEEE Access, Jan. 1, 2019, pp. 9714-9723, vol. 7.

* cited by examiner

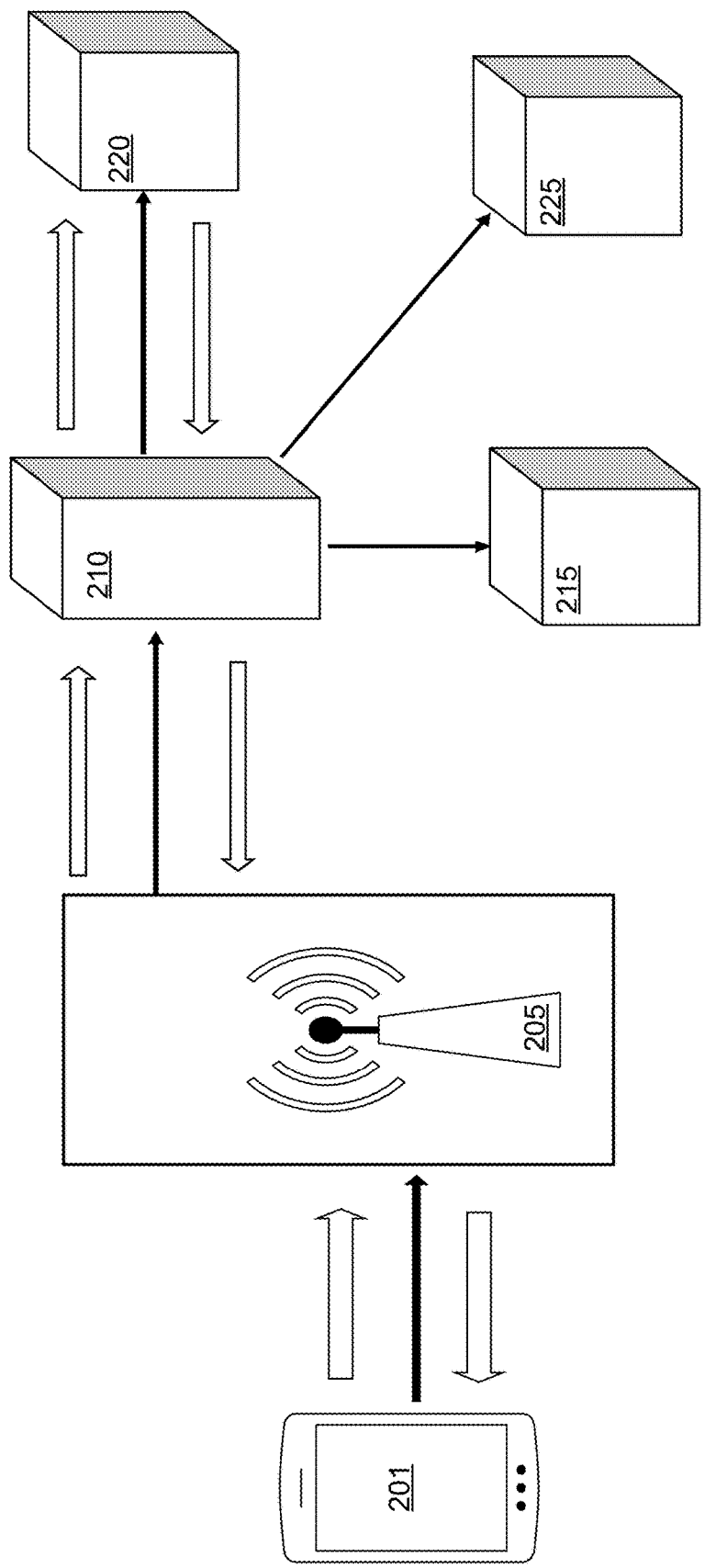

METHODS AND SYSTEMS FOR BLOCKCHAIN SMART CONTRACT IN HOTSPOT 2.0 NETWORK FOR USER AUTHENTICATION WHILE ROAMING

DESCRIPTION OF RELATED ART

As Wi-Fi technology continues to evolve and grow at a rapid pace, it is becoming increasingly more important for wireless networking systems to focus on improving the user experience. For instance, the user of a mobile device, such as a cell phone (e.g., smart phone) may prefer using their phone's wireless connectivity to easily and securely connect to a wireless network. Accordingly, emerging wireless technologies, such as Hotspot 2.0, are progressing towards providing simple, seamless, and secure connectivity to public Wi-Fi hotspots using a cellular-style "roaming" for Wi-Fi networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 illustrates an example of a prior art wireless network providing roaming access to a wireless network using a convention user authentication technique, according to some embodiments.

The figures are not exhaustive and do not limit the present disclosure to the precise form disclosed.

DETAILED DESCRIPTION

Various embodiments described herein are directed to a method and a system of employing blockchain to provide a secure and efficient approach for user authentication for wireless networks, particularly for roaming Wi-Fi networks. According to the embodiments, a wireless access point (WAP) is enabled for blockchain communication in a manner that allows blockchain features, such as smart contracts, decentralization, and immutability, to be leveraged to replace conventional more cumbersome and centralized mechanisms of user authentication. For example, the disclosed blockchain-based approach eliminates the use of a third party devices, such as roaming hubs, that many existing Wi-Fi networks currently employ for hotspot access.

Figure 1A:
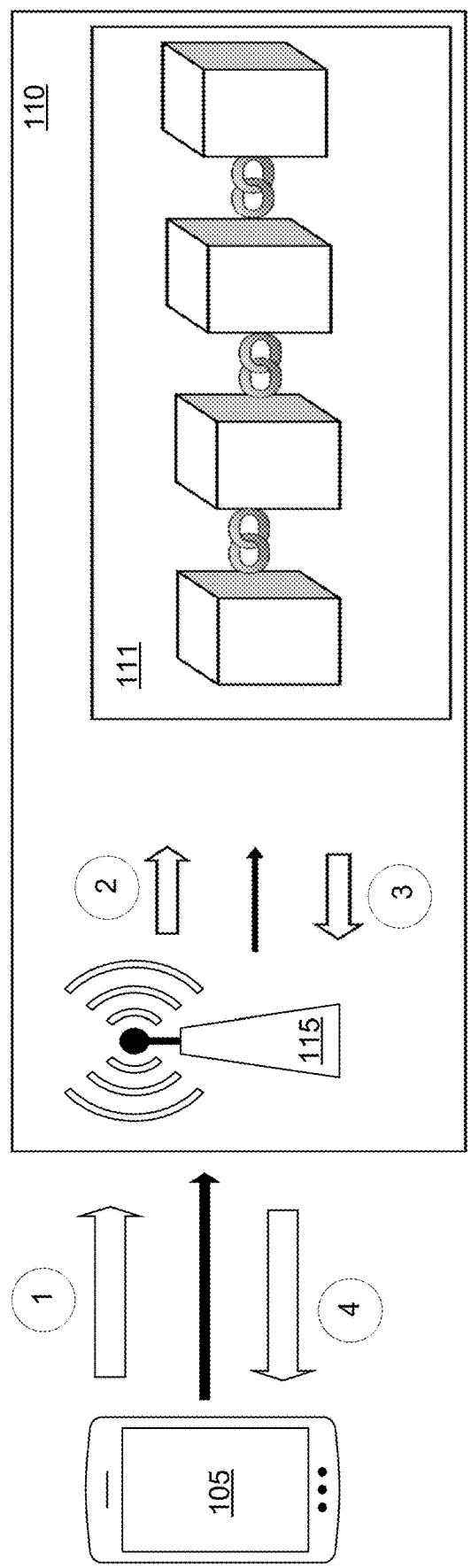
FIG. 1A depicts a mobile device communicating with a wireless access point (WAP), where the WAP performs user authentication for roaming access to a wireless network using blockchain, according to some embodiments.

FIG. 1A shows an example communication between a mobile device 105 and a wireless access point (WAP) 115 for performing a blockchain-based user authentication technique, as disclosed herein. The mobile device 105 can be associated with a user that is subscribed to a first service provider. As used herein, Wi-Fi is a family of radio technologies that is commonly used for the wireless local area networking (WLAN) of devices which is based around the IEEE 802.11 family of standards. Wi-Fi uses multiple parts of the IEEE 802 protocol family and is designed to seamlessly interwork with its wired sister protocol Ethernet.

The mobile device 105 can be any portable device which should be a passpoint certified device with hotspot 2.0 capability. For instance, the mobile device 105 can be implemented as a laptop, smartphone, tablet, digital audio players, and the like. The mobile device 105 can also be associated with a user of the device. The user can subscribe to a particular communication service, such as cellular service, which is provided by a service provider. In an example, the mobile device 105 can be a smartphone that can communicate via a cellular network provided by the user's service provider. In addition to cellular communication, the mobile device 105 can connect to Wi-Fi. As seen in FIG. 1A, the mobile device 105 can attempt to connect to a Wi-Fi network through a wireless access point (WAP) 115. The WAP 115 can further provide wireless access to wide area networks (WANs), such as the Internet. The WAP 115 can have convention capabilities of an access point, for example having a wireless connection range of about 20 meters (66 feet) indoors to connect with other devices that are in the vicinity.

In FIG. 1A, the mobile device 105 can be at a location that is considered a public hotspot. To gain Wi-Fi access, the mobile device 105 may attempt to connect to a blockchain enabled wireless access point (WAP), shown as HotSpot 2.0 (HS2) device 110. For purposes of discussion, the communication in FIG. 1A is described with respect to network operating in accordance with the HS2 specification, described in greater detail below. However, it should be appreciated that the blockchain techniques can be applied to other types of wireless networks, as deemed appropriate or desirable.

As background, a hotspot can be a physical location where wireless access to a wide area network (WAN), such as the Internet, can be established, typically using Wi-Fi technology. Hotspot coverage can be as small as a single room, or as large as many square kilometers (km) achieved by using multiple overlapping access points. Often times, public hotspots are made available at businesses, such as coffee shops and hotels, to provide Wi-Fi access for their customers. To address the high demand and proliferation of public access to Wi-Fi, new wireless standards have emerged, such as HS2, that are designed to make access Wi-Fi via hotspots more secure and seamless. HS2 is a technical specification (leveraging IEEE 802.11u wireless standards) for Wi-Fi developed by the Wi-Fi Alliance to allow mobile devices to automatically join Wi-Fi networks using a cellular-style "roaming". In other words, mobile device 105 can connect to an available public hotspot, even in instances when the hotspot is managed by a different service provider.

HS2 is a standard for public-access Wi-Fi that enables seamless roaming among Wi-Fi networks and between Wi-Fi and cellular networks. It is based on the IEEE 802.11u standard for interworking with external networks. With the advent of smart phones and tablets, the data consumption and strain on cellular networks has increased significantly. HS2 enables cellular network-like roaming that requires little or no manual intervention allowing users to automatically switch to a Wi-Fi network, whenever it is available, and free up the cellular network. However, user authentication is typically required, prior permitting access to the Wi-Fi network.

Thus, in FIG. 1A, the initial communication involves mobile device 105 attempting a connection to HS2 AP 110. A key concept if that the HS2 AP 110 is blockchain-enabled, or otherwise has connectivity to a blockchain network 111. Accordingly, FIG. 1A illustrates HS2 AP 115 as being connected to the blockchain 111, and having a local copy of the blockchain ledger. Generally, a blockchain network 110 can be a network where nodes use a consensus mechanism to update a blockchain that is distributed across multiple parties. Furthermore, according to various implementations, the HS2 AP 110 (also referred to herein as a blockchain-enabled WAP) and components described herein may be implemented in hardware and/or software that configure hardware. According to the embodiments, information that is pertinent to user authentication for the mobile device 105 is accessible via the blockchain network 111. For instance, using smart contacts in the blockchain network 111, verifiable information regarding roaming agreements amongst various service providers, can be obtained by the HS2 AP 115. Thus, as the mobile device 105 attempts to access Wi-Fi vis-à-vis HS2 AP 110, the HS2 AP 110 can consult the blockchain network 111 to retrieve the information necessary for user authentication. By the HS2 AP 110 collecting this information directly from the blockchain network 111, this disclosed user authentication techniques does not require additional connections to various other entities that may hold this information in a centralized architecture in many current Wi-Fi networks. For example, FIG. 2 illustrates an example of a currently existing user authentication approach, for instance as currently used with Passpoint wireless networks.

As seen in FIG. 2, the WAP 205 has to initially connect to a roaming hub 210 to communicate the authentication information it has received from the mobile device 201. Subsequently, in yet another connection, the roaming hub 210 has to then forward this authentication information to multiple other services providers that are distributed across the network. For instance, in the case of a roaming user, the roaming hub 210 may be required to transmit the received user authentication information to an authentication server 220 of the service provider for the mobile device 201. In the case where the service provider of mobile device 201 is different, the request will be forwarded to a corresponding authentication server for example server 215 or server 225. After receiving responses from the contacted authentication server 220 (or server 215, server 225), then the WAP 205 can determine whether to permit or deny access to Wi-Fi for the mobile device 201. Due to its reliance on a third party, namely the roaming hub, and having to contact multiple entities, this conventional user authentication approach can experience latencies, and is prone to single point failures (e.g., connection to an authentication server fails). By leveraging the peer-to-peer configuration and immutability of blockchain, the disclosed user authentication techniques circumvents such a distributed process, thereby improving efficiency and security of the authentication.

Figure 3:
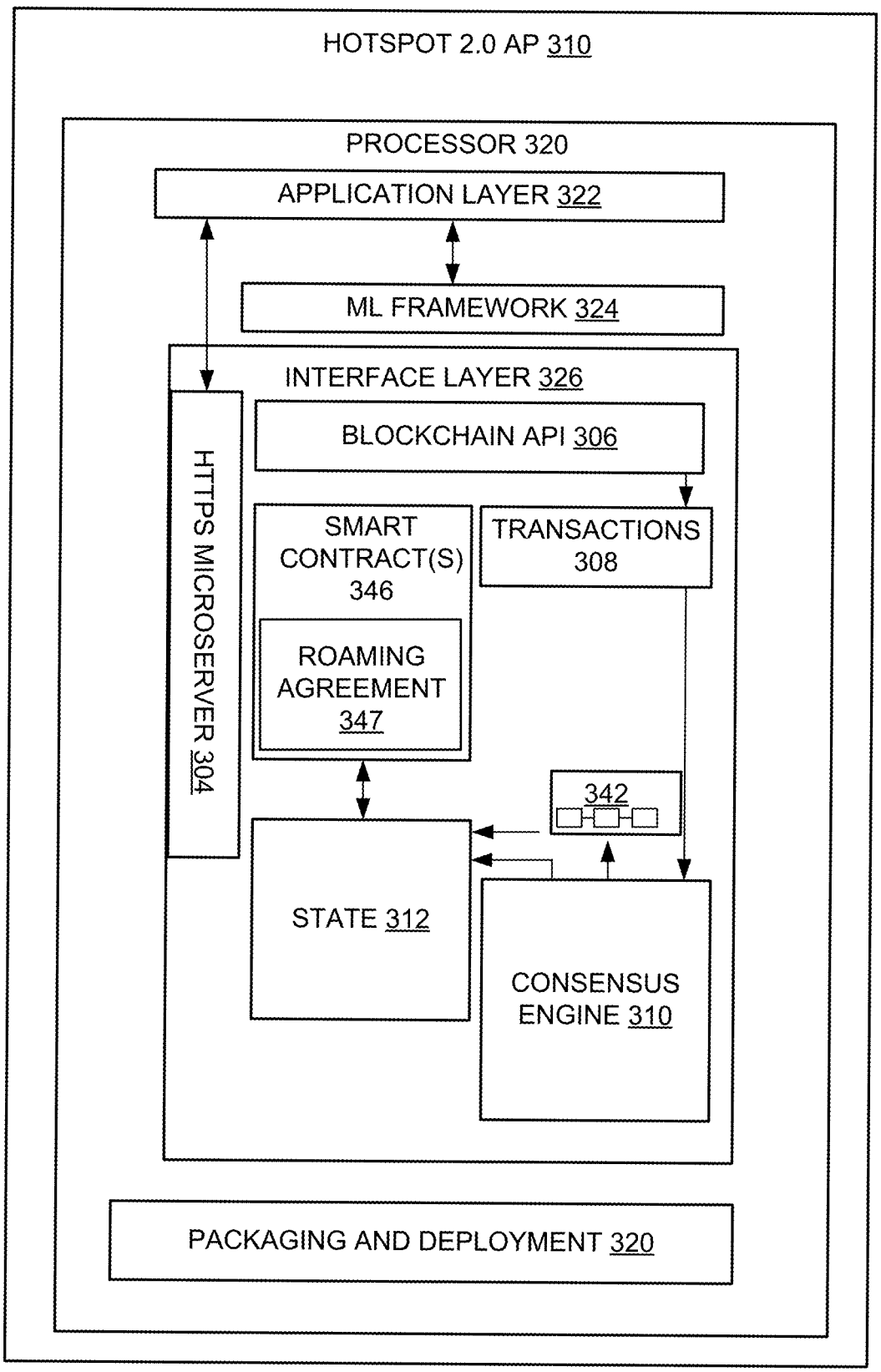
FIG. 3 illustrates an example of a WAP used in the Hotspot 2.0 system of FIG. 1B, where the system employs user authentication for roaming access to a wireless network using blockchain, according to some embodiments.

FIG. 3 shows an example of the HS2 AP 310 and its components enabling the disclosed user authentication techniques using blockchain. The HS2 AP 310 may include a storage device for storing: distributed ledger 342, smart contract(s) 346, and roaming agreement 347. The distributed ledger 342 may include a series of blocks of data that reference at least another block, such as a previous block. In this manner, the blocks of data may be chained together. The distributed ledger 342 may store blocks that indicate a state of a node relating to authentication of a user, for example. Thus, the distributed ledger 342 may store an immutable record of the state transitions of a node. In this manner, the distributed ledger 342 may store a current and historic state of authentication related data. For instance, the distributed ledger 342 may store a historical chain of successful authentications of multiple users from a particular service provider at the AP 310. It should be noted, however, that in some embodiments, some collection of records, models, and smart contracts from one or more of other nodes may be stored in distributed ledger 342.

The distributed ledger 342, smart contracts 346, roaming agreement 347, user authentication data and/or other information described herein may be stored in various storage devices such as storage device. Other storage may be used as well, depending on the particular storage and retrieval requirements. For example, the various information described herein may be stored using one or more databases. Other databases, such as Informix™, DB2 (Database 2) or other data storage, including file-based, or query formats, platforms, or resources such as OLAP (On Line Analytical Processing), SQL (Structured Query Language), a SAN (storage area network), or others may also be used, incorporated, or accessed. The database may comprise one or more such databases that reside in one or more physical devices and in one or more physical locations. The database may store a plurality of types of data and/or files and associated data or file descriptions, administrative information, or any other data.

The smart contracts 346 may include rules that configure nodes in the blockchain network, including the HS2 AP 310 to behave in certain ways in relation to user authentication. For example, the rules may specify actions for verifying the terms of roaming agreement 347 between certain service providers, verifying the user authentication of a particular service provider, and/or other actions that a node may take for user authentication using blockchain.

Processors 320 may be programmed by one or more computer program instructions. For example, processors 320 may be programmed to execute an application layer 322, a machine learning framework 324 (illustrated and also referred to as ML framework 24), an interface layer 326, and/or other instructions to perform various operations, each of which are described in greater detail herein. The processors 320 may obtain other data accessible locally to the HS2 AP 310 but not necessarily accessible to other participant nodes as well. Such locally accessible data may include, for example, user authentication related data, such as user credentials, that should not be shared with other user devices.

The application layer 322 may execute applications on a node, such as HS2 AP 310. For instance, the application layer 322 may include a blockchain agent (not illustrated) that programs the node to participate and/or serve as a master node in user authentication across the blockchain network (shown in FIG. 1A) as described herein. Each node in the blockchain may be programmed with the same blockchain agent, thereby ensuring that each node acts according to the same set of decentralized rules, such as those encoded using smart contracts 346. For example, the blockchain agent may program each node to provide a particular set of information related to authentication, for example user credentials and an indication of an authentication result (e.g., approved or rejected). In some instances, the application layer 322 may execute so form of machine learning through the ML framework 324.

The application layer 322 may use the interface layer 326 to interact with and participate in the blockchain network for user authentication. The interface layer 326 may communicate with other nodes using blockchain by, for example, broadcasting blockchain transactions and writing blocks to the distributed ledger 342 based on those transactions, as well as based on the activities of other nodes in the blockchain network. The interface layer 326 may include a messaging interface used for a node, such as HS2 AP 310 to communicate via the blockchain network with other participant nodes. As an example, the interface layer 326 provides the interface that allows HS2 AP 310 to communicate authentication related data from a user request to the other participating nodes during the disclosed authentication process. The messaging interface may be configured as a Secure Hypertext Transmission Protocol ("HTTPS") microserver 304. Other types of messaging interfaces may be used as well.

The interface layer 326 may use a blockchain API 306 to make API calls for blockchain functions based on a blockchain specification. Examples of blockchain functions include, but are not limited to, reading and writing blockchain transactions 308 and reading and writing blockchain blocks to the distributed ledger 342. One example of a blockchain specification is the Ethereum specification. Other blockchain specifications may be used as well.

Consensus engine 310 may include functions that facilitate the writing of data to the distributed ledger 342. For example, in some instances the HS2 AP 310 may use the consensus engine 310 to decide when to send information to a particular node. For example, the HS2 AP 310 may send an indicated that the user has been authenticated (e.g., approved) for roaming access to its Wi-Fi network to other nodes, and write an indication for updating that its state 312 has changed as a result to the distributed ledger 342, and/or to perform other actions. In this way, a consensus regarding certain decisions, for example automatically connecting a previously authenticated user to Wi-Fi can be reached after data is written to distributed ledger 342.

In some implementations, packaging and deployment 320 may package and deploy a model as a containerized object. For example, and without limitation, packaging and deployment 320 may use the Docker platform to generate Docker files that include a model. Other containerization platforms may be used as well. In this manner various applications at a node may access and use the model in a platform-independent manner. As such, the models may not only be built based on collective parameters from nodes in a blockchain network, but also be packaged and deployed in diverse environments.

Figure 1B:
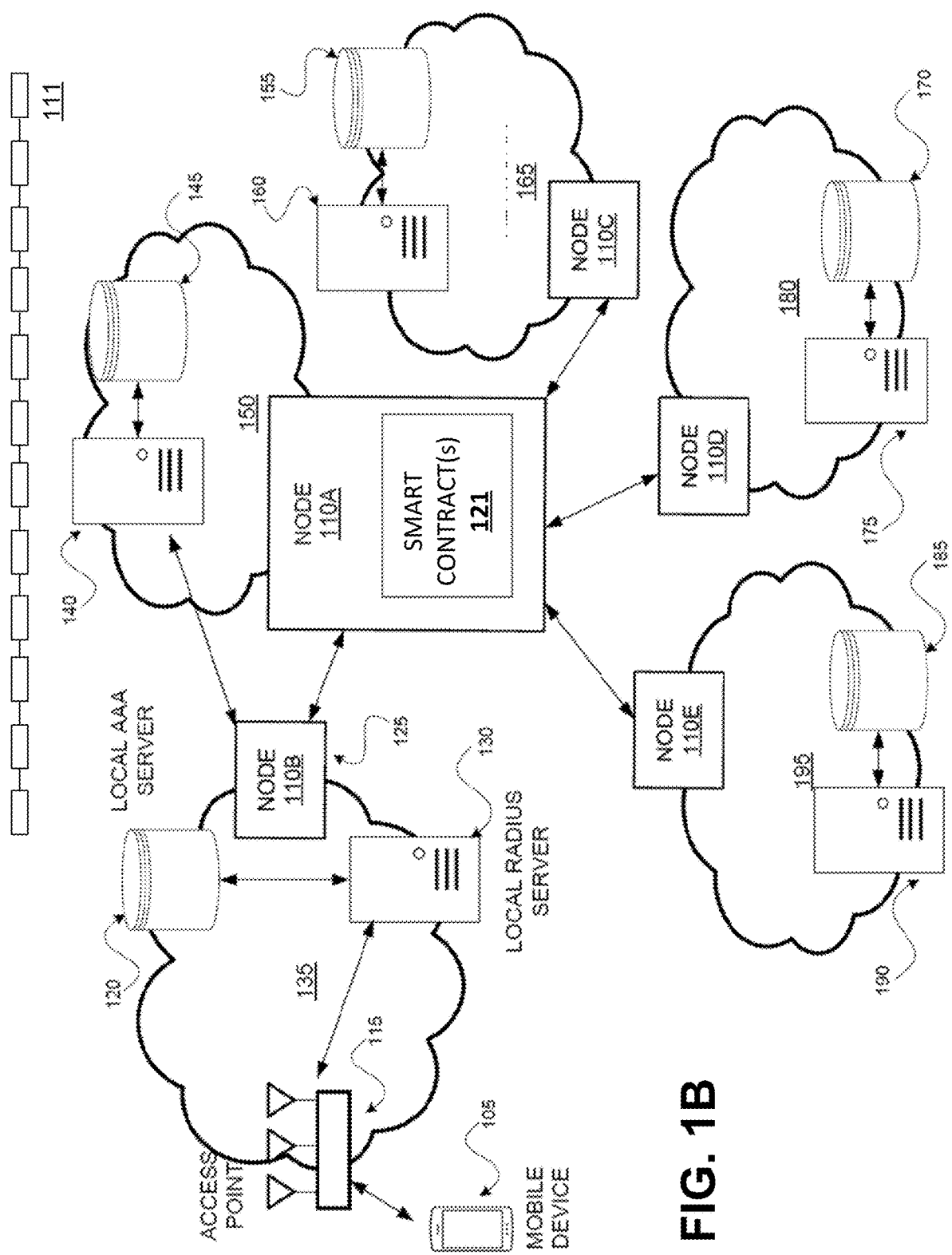
FIG. 1B illustrates an example of a Hotspot 2.0 network implementing user authentication for roaming access to a wireless network using blockchain, according to some embodiments.

Referring now to FIG. 1B, an example of a wireless communication system implementing user authentication using blockchain. As previously described, a mobile device 105 can be in a location, such as a public hotspot, where an attempt for access to a roaming Wi-Fi network 135 is made. Accordingly, the mobile device 105 can establish a connection to blockchain-enabled WAP 115. Additionally, FIG. 1B illustrates nodes 110A-110E, where each node corresponds to a respective service provider network, 150, 165, 180, and 195. In this system, each of the nodes 110A-110E, as well as the WAP 115, can connect to blockchain network 111. According to the embodiments, information pertinent to the disclosed user authentication process, such as smart contracts 121, and user credentials for a provider, is made available via the blockchain 111. Thus, each of the nodes 110A-110E, including the blockchain enabled WAP 115 has the capability to locally obtain information made available via the blockchain ledger of blockchain network 111. As such, the smart contracts 121 and the blockchain 111 can be used as trust-worthy and unbiased regulators of the collaboration between multiple network providers for roaming access to Wi-Fi. By enabling access to the blockchain 111, each node 110A-110E, and the WAP 115, has a trusted version of authentication information, allowing the disclosed authentication process to be seamlessly peer-to-peer (as opposed to centralized). In other words, the multiple service providers 150, 165, 180, 195, can easily collaborate over the blockchain ledger, via the blockchain 111, rather than establishing multiple separate connections to a third party.

Figure 4:
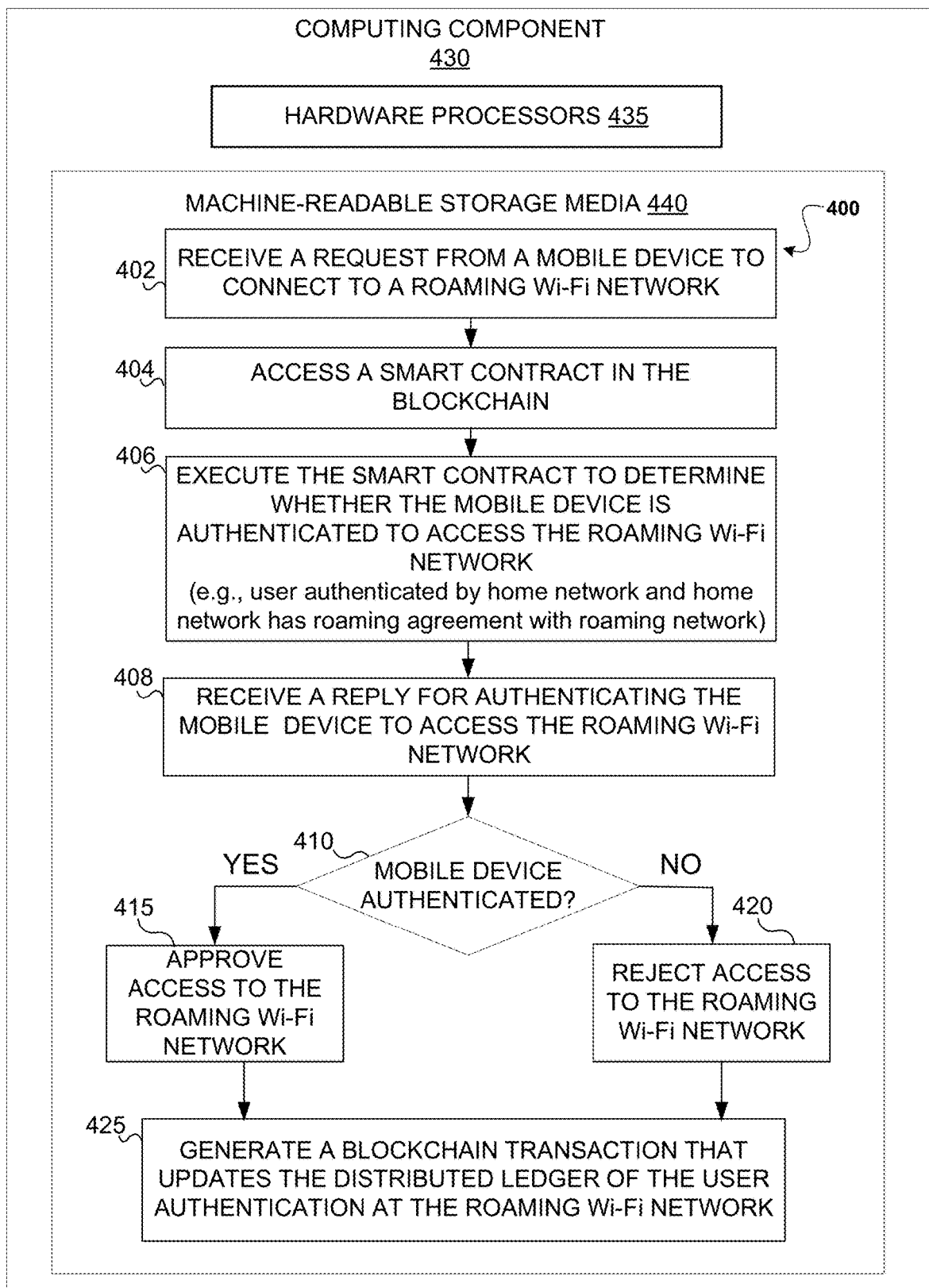
FIG. 4 is an operational flow diagram illustrating an example of a process for authenticating a user requesting roaming access to a wireless network using blockchain, according to some embodiments.

Further details of the disclosed blockchain-based user authentication are now described with reference to FIG. 4. In detail, FIG. 4 illustrates an example of a process 400 involving user authentication for access to a wireless network, for example a Wi-Fi network, using blockchain. According to an embodiment of the systems and methods described herein, the process can be performed by a blockchain enabled WAP device (shown in FIG. 2). Accordingly, process 400 is illustrated as a series of executable operations stored in a machine-readable storage media 440, and being performed by hardware processors 430 in a computing component 430, which can be the WAP having blockchain capabilities (shown in FIG. 1A), as described above. Hardware processors 435 execute the operations of process 400, thereby implementing the disclosed network embedding techniques described herein.

As alluded to above, the process 400 can be specifically implemented for access to a Wi-Fi network in accordance with the HS2 networking standard. For purposes of illustration, the process 400 is described with respect to a HS2 networking standard. As an example, a user operating a mobile device may enter into a public area, such as an airport, coffee shop, or hotel. These public areas are often hotspots, having multiple Wi-Fi networks that are made available for Internet access for devices within its local vicinity. As previously discussed, it may be difficult for a user that is just entering the area to recognize which networks are safe and others which may be potentially malicious. Accordingly, the user may select to have its mobile device connect to Wi-Fi that is made available by a well-known service provider, such as Verizon. However, the mobile device may be a cell phone having its cellular service made available through another service provider, for example AT&T. Typically, a particular user authentication process is required in order for a mobile device registered with a service provider to connect to the Wi-Fi network of another service provider. For instance, the HS2 network standard uses a roaming consortium to indicate which service providers cooperatively support connection and roaming policies for their users, allowing authenticated users of a partnered service provider (in the consortium) roaming access to their wireless networks.

Referring to the example scenario, authentication of the AT&T mobile device may be required for allowed access to Verizon's Wi-Fi network. A user can attempt to access Verizon's Wi-Fi via its corresponding WAP located at the public hotspot, but must be authenticated before this access is granted (and the connection to the Wi-Fi network established). In conventional systems, as described in reference to FIG. 2, a third party (or an additional network element) is contacted in order to perform such an authentication. In contrast, according to the embodiments, a blockchain enabled WAP can perform user authentication for "roaming" access to a wireless network using blockchain, in a manner that eliminates the need for a third party, thereby providing a more streamlined and secure process (e.g., leveraging security of blockchain).

In operation 402, the blockchain enabled WAP may receive a request from a mobile device to connect to a "roaming" Wi-Fi network. As referred to herein, the term "roaming" network describes a wireless network that is facilitated by a secondary service provider, or a different service provider from the service provider of mobile device. Referring back to the example in FIG. 1B, the mobile device may be a cell phone that is registered to AT&T for its cellular service. Accordingly, any Wi-Fi networks provided by AT&T can be considered "home" networks for the mobile device. For instance, the mobile device may be permitted to connect automatically to a WAP for AT&T Wi-Fi. However, the mobile device may enter an area that hosts a public hotspot for a Wi-Fi network provided by another company, such as Verizon. In this scenario, the mobile device, although registered to another service provider can use a cellular-style "roaming" to access Wi-Fi networks outside of its "home" provider. In the previous example, Verizon Wi-Fi would be considered a "roaming" Wi-Fi network for the AT& mobile device. Accordingly, in operation 402, the mobile device can initially communicate with the blockchain enabled WAP that is deployed by the service provider of the "roaming" Wi-Fi network (with respect to the user). For instance, the WAP may be deployed by Verizon at a hotspot for access to a Wi-Fi network similarly facilitated by Verizon, but can receive an access request from the mobile device having cellular service by AT&T in operation 402.

Next, at operation 404, the WAP can access the blockchain. As alluded to above, the blockchain-enabled WAP has access to a blockchain network allowing it access to the blockchain ledger. In response to the WAP receiving an access request from a mobile device that is considered "roaming" with respect to its network (registered to a different service provider) in previous operation 402, the WAP can be configured to initially consult the blockchain in operation 404 for any relevant information. Referring again to the example scenario, a "home" service provider of the mobile device, for instance AT&T, may have a roaming agreement in place with the service provider of the "roaming" Wi-Fi network (associated with the AP), for instance Verizon. The roaming agreement may indicate that hotspot services of either provider can be extended to an authenticated user of the partnered provider. In the example, an AT&T mobile device may be allowed to have "roaming" access to a Verizon Wi-Fi network, in accordance with the roaming agreement. This roaming agreement between the service providers is thus deployed as a smart contract in a blockchain that is accessible to a hotspot WAP. Furthermore, as blockchain has the feature of immutability, the smart contract corresponding to a roaming agreement is also immutable, remaining a permanent, indelible, and unalterable record of the blockchain ledger. As a result, any point subsequent to implementing the smart contract for accessing a "roaming" Wi-Fi network, the WAP should be able to verify information that is pertinent to authenticating the requesting mobile device by accessing the blockchain ledger during operation 404.

Next, at operation 406, the smart contract can be executed to determine whether the requesting mobile device can be properly authenticated and permitted access to the "roaming" Wi-Fi network. As described above, a smart contact is a computer protocol that can digitally facilitate, verify, or enforce the negotiation (or performance) of a contact. In this example, the contract is the roaming agreement, which indicates that a registered AT&T user is allowed roaming access to Verizon's Wi-Fi networks. During operation 406, the smart contracts can be executed in manner that verifies the terms of the roaming agreement between the service provider of the mobile device and the service provider of the "roaming" Wi-Fi network. In some cases, the code and the agreements of the smart contracts exist across the distributed, decentralized blockchain network. For example, the smart contact may include lines of code that are written to execute the verification of two significant terms of the roaming agreement: 1) contacting the service provider associated with the mobile device to verify that the user is an authenticated user; and then 2) contacting the service provider facilitating the "roaming" Wi-Fi network to verify that the other service provider (corresponding to the mobile device/authenticated user) is currently in "good standing" in its agreement for allowed roaming access to their Wi-Fi networks. Referring once again to the example scenario, executing the smart contract at operation 406 may involve: 1) contacting AT&T to verify that the user of the mobile device is an authenticated user of AT&T cellular service, and 2) contacting Verizon to verify that an agreement currently exists with AT&T which allows their users to roaming access to Verizon Wi-Fi (via hotspot services). In response to verifying the terms of the smart contact, for instance receiving approvals from both AT&T and Verizon based on the inquiries, the requesting mobile device is authenticated for accessing the "roaming" Wi-Fi network. Successfully authenticating the requesting mobile device (for accessing the particular Wi-Fi network or service provider for multiple Wi-Fi networks) can be recorded as a transaction in the blockchain ledger. In contrast, the mobile device may fail to be authenticated if the terms of the smart contact cannot be verified. As an example, if contacting Verizon indicates that the roaming agreement between Verizon and AT&T has been voided, or contacting AT&T indicates that the user not being a bona fide subscriber to AT&T services, then user authentication for the mobile device has failed with respect to the smart contract.

In a similar manner, the blockchain ledger can also be comprised of a plurality of other transactions that are associated with different instances of user authentication performed to allow "roaming" access to wireless networks. For instance, authentication data from other mobile devices (having several different service providers) attempting "roaming" access to the Verizon Wi-Fi network via their public hotspot can also be recorded in the blockchain ledger. Accordingly, the blockchain ledger can have information from different service providers, which can be shared among each of the service provides and their respective deployed WAPs.

Therefore, in response to executing the smart contract, the blockchain-enabled WAP can obtain a reply for user authentication corresponding to the requesting mobile device. At operation 408, the blockchain-enabled WAP can access the blockchain to obtain the particular transaction in the blockchain ledger that is associated with authenticating the requesting mobile device for accessing its Wi-Fi network. The reply obtain during operation 408 can indicate whether the smart contact user has been successfully authenticated with respect to the terms of the smart contact, or roaming agreement, and in turn enforces the smart contract. In some instances, authorization information and expected credentials for a user, for example, may be encoded within the smart contracts or other stored information available to nodes on the blockchain network.

Thus, proceeding to operation 410, the block-enabled WAP can use the authentication reply to perform the conditional check for whether "roaming" access to the Wi-Fi network is allowed for the requesting mobile device. The conditional check in operation 410 either results in operation 415 where the WAP permits the mobile device to have "roaming" access to the Wi-Fi network, or alternatively to operation 420 where the WAP denies access for the mobile device.

In the case where the mobile device is successfully authenticated (e.g., terms of the smart contract verified) (shown as "Yes" in FIG. 4), the WAP enforces the smart contract by proceeding to operation 415 and allowing the requesting mobile device to access the Wi-Fi network (subsequently establishing a wireless connection between the mobile device and the Wi-Fi network). In other words, in the example scenario, the WAP allows "roaming" access for the AT&T mobile device to Verizon's Wi-Fi network based on verifying the roaming agreement between the service providers using blockchain.

Otherwise, in the case where the mobile device fails authentication (e.g., terms of the smart contract are not verified) (shown as "No" in FIG. 4), the WAP enforces the smart contract by proceeding to operation 420 and denying "roaming" access to the Wi-Fi network. In reference to the example scenario, the WAP may reject a request for "roaming" access by the AT&T mobile device to Verizon's Wi-Fi network, if the roaming agreement between the service providers is no longer valid.

Thereafter, process 400 can proceed to operation 425 (from operation 415 or operation 420). In operation 425, the distributed ledger can be updated by the WAP to reflect whether the mobile device was successfully authenticated and allowed "roaming" access to the Wi-Fi network by that particular WAP. Due to the update to the blockchain at operation 425, the WAP can access the blockchain ledger which maintains and immutable record indicating the mobile device has already completed a successful authenticated to for "roaming" access to Wi-Fi at that public hotspot. As alluded to above, a feature of the HS2 standard is providing seamless and secure connection to public Wi-Fi hotspots. Thus, for example, in the event that the AT&T user returns to the Verizon public hotspot at a later date, the WAP can detect the presence of the same mobile device in its range. Subsequently, the WAP can verify that the AT&T mobile device has been previously authenticated for "roaming" access for Verizon's Wi-Fi networks simply by consulting the blockchain (assuming the blockchain ledger is updated with the transaction reflecting the previous authenticated roaming access for the AT&T device). Consequently, by updating the blockchain ledger with transactions of successful authentications (and/or failed authentications), for instance during operation 425, the WAP may be able to automatically connect (or deny) an already authenticated mobile device to Wi-Fi without extra steps, similar to cellular roaming.

Figure 5:
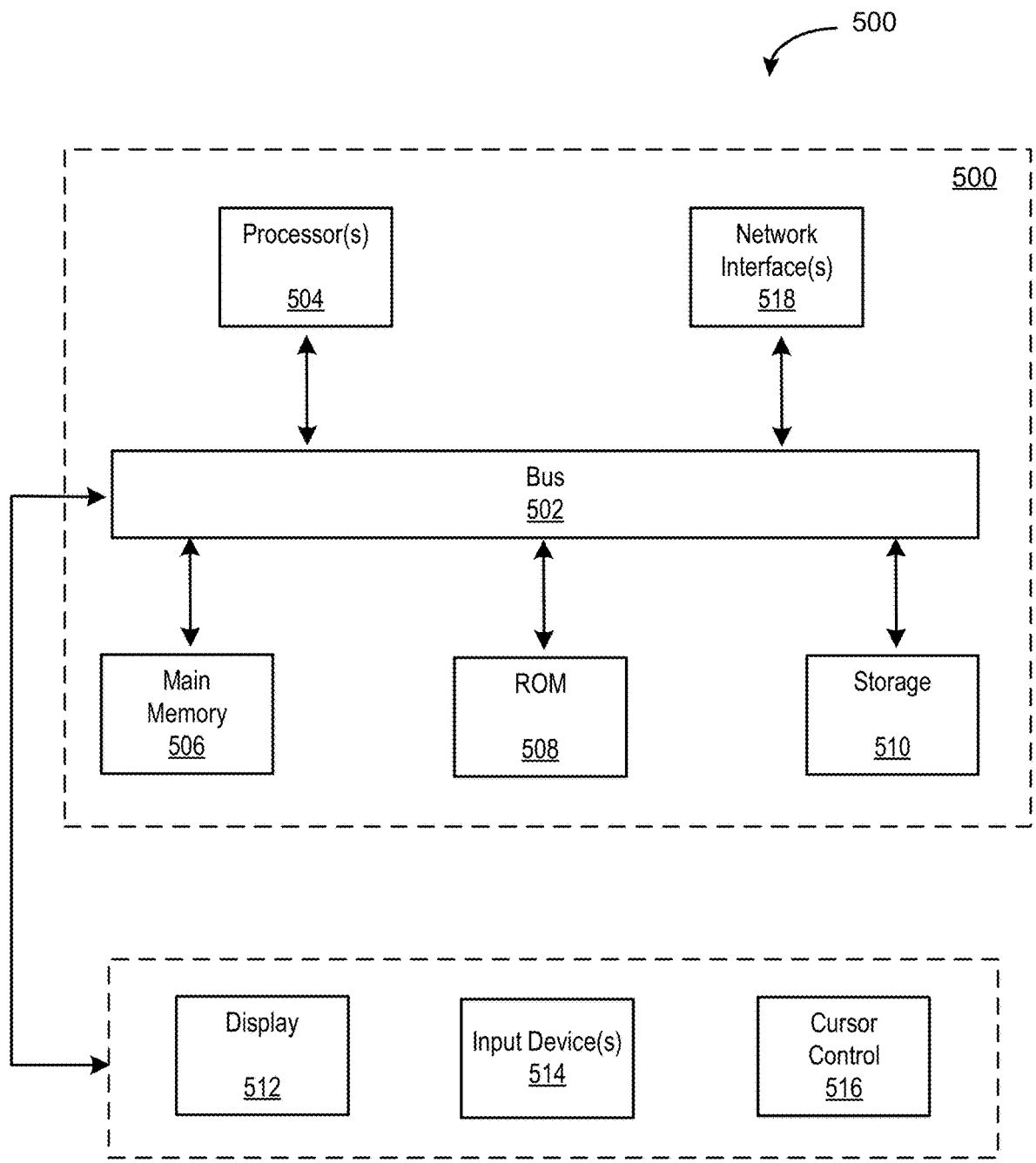
FIG. 5 illustrates an example computer system that may be used in implementing user authentication using blockchain relating to the embodiments of the disclosed technology.

FIG. 5 depicts a block diagram of an example computer system 500 in which the disclosed user authentication using blockchain may be implemented. Furthermore, it should be appreciated that although the various instructions are illustrated as being co-located within a single processing unit, such as the WAP (shown in FIG. 1A), in implementations in which processor(s) includes multiple processing units, one or more instructions may be executed remotely from the other instructions.

The computer system 500 includes a bus 502 or other communication mechanism for communicating information, one or more hardware processors 504 coupled with bus 512 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 716, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 706 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 516. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 710, are example forms of transmission media.

The computer system 500 can send messages and receive data, including program code, through the network(s), network link and communication interface 718. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for user authentication at a roaming communications network using blockchain, comprising:
   receiving, by an access point of the roaming communications network, a request to connect to the roaming communications network;
   accessing, by the access point, a smart contract in the blockchain via a blockchain network;
   executing the smart contract in the blockchain to determine whether the user is authenticated for approval to access the roaming communications network;
   determining that the user is authenticated for approval to access the roaming communications network;
   updating a distributed ledger in the Blockchain associated with the roaming communications network with authentication data associated with the user;
   approving the request to connect to the roaming communications network; and
   connecting, by the access point, the user to the roaming communications networks;
   wherein executing the smart contract in the blockchain to determine whether the user is authenticated for approval to access the roaming communications network comprises analyzing the smart contract to determine that the user is authenticated by a home communications network associated with the user and analyzing the smart contract to determine that the roaming communications network has an agreement with the home communications network associated with the user to allow access to the roaming communications network via the access point.

2. The method of claim 1, wherein analyzing the smart contract to determine that the user is authenticated by a home communications network associated with the user comprises:
   obtaining verification from the home communications network using the blockchain to determine that the user is an authenticated user of the home communications network.

3. The method of claim 1, wherein analyzing the smart contract to determine that the roaming communications network has an agreement with the home communications network associated with the user comprises:
   obtaining verification from the roaming communications network using the blockchain that the agreement with the home network is approved.

4. The method of claim 3, wherein the agreement is deployed as the smart contract in the blockchain.

5. The method of claim 1, wherein the roaming communications network is a Wi-Fi network.

6. The method of claim 5, wherein the connection to the Wi-Fi network is established in accordance with a Hotspot 2.0 (HS2) networking standard.

7. The method of claim 1, including updating the blockchain ledger in the blockchain associated with the home communications network with the authentication data associated with the user.

8. A wireless access point (WAP) device, comprising:
   connectivity to a blockchain network;
   connectivity to a Wi-Fi network associated with a first service provider;
   a processor; and a
   storage medium comprising instructions, which when executed by the processor, causes the WAP device to:
      receive a request from a mobile device to connect to the Wi-Fi network, wherein the mobile device is associated with a second service provider different from the first service provider;
      access a smart contract in a blockchain via the blockchain network;
      execute the smart contract in the blockchain to determine that a user of the mobile device is authenticated by the second service provider;
      execute the smart contract in the blockchain to determine whether a user of the mobile device is authenticated for approval of roaming access to the Wi-Fi network;
      if it is determined that the user of the mobile device is authenticated for the roaming access to the Wi-Fi network, approve the request to connect to the Wi-Fi network;
      update a distributed ledger in the Blockchain at the WAP with authentication data associated with the user; and
      connect the mobile device to the Wi-Fi network;
      wherein the instructions to execute the smart contract in the blockchain to determine whether the user of the mobile device is authenticated for approval comprises instructions, that when executed by the processor, cause the processor to execute the smart contract to determine that the first service provider has an agreement with the second service provider to allow the roaming access to the Wi-Fi network via the WAP.

9. The WAP of claim 8, executing further instructions by the processor, causing the WAP device to:
   obtain verification from the second service provider using the blockchain to determine that the user of the mobile device is an authenticated user of the second service provider.

10. The WAP of claim 8, executing further instructions by the processor, causing the WAP device to:
    obtain verification from the first service provider using the blockchain that the agreement with the second service provider is approved.

11. The WAP of claim 10, wherein the agreement is deployed as the smart contract in the blockchain.

12. The WAP of claim 11, wherein connecting to the Wi-Fi network is performed in accordance with a Hotspot 2.0 (HS2) networking standard.

13. A non-transitory machine-readable storage medium comprising instructions executable by a processor of a blockchain-enabled hotspot 2.0 access point (AP), the instructions programming the processor to:
- receive a request from a mobile device to connect to a Wi-Fi network;
- access a smart contract in a blockchain via a blockchain network;
- execute the smart contract in the blockchain to determine whether a user of the mobile device is authenticated for approval of roaming access to the Wi-Fi network;
- if it is determined that the user of the mobile device is authenticated for the roaming access to the Wi-Fi network, approving the request to connect to the Wi-Fi network;
- update a distributed ledger in the blockchain associated with the Wi-Fi network with authentication data associated with the user; and
- connect the mobile device to the Wi-Fi network;
  - wherein the instructions to execute the smart contract in the blockchain to determine whether the user of the mobile device is authenticated for approval of the roaming access to the Wi-Fi network comprises instructions executable by the processor to analyze the smart contract to determine that the user is authenticated by a service provider of the mobile device and instructions executable by the processor to obtain verification from the service provider using the blockchain to determine that the user is an authenticated user of the service provider.

* * * * *